United States Patent
Metlitasky et al.

(10) Patent No.: US 6,328,212 B1
(45) Date of Patent: Dec. 11, 2001

(54) SYSTEM FOR READING DATA ON DIFFERENT PLANES OF FOCUS BASED ON REFLECTED LIGHT

(75) Inventors: Boris Metlitasky, Stony Brook; Jerome Swartz, Old Field; Edward Barkan, Miller Place, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 08/482,556

(22) Filed: Jun. 7, 1995

Related U.S. Application Data

(62) Division of application No. 08/425,808, filed on Apr. 20, 1995, now Pat. No. 5,557,094, which is a division of application No. 08/056,878, filed on May 5, 1993, now Pat. No. 5,410,139, which is a continuation of application No. 08/047,340, filed on Apr. 19, 1993, now Pat. No. 5,268,564, which is a continuation of application No. 07/772,745, filed on Oct. 7, 1991, now abandoned, which is a continuation of application No. 07/562,130, filed on Aug. 3, 1990, now Pat. No. 5,151,580.

(51) Int. Cl.$^7$ .................................................. G06K 7/10
(52) U.S. Cl. ................................ 235/462.16; 235/462.19
(58) Field of Search .................................. 235/462, 463, 235/467, 470, 472, 462.22, 462.16, 462.19

(56) References Cited

U.S. PATENT DOCUMENTS

| | | | |
|---|---|---|---|
| 3,812,477 | 5/1974 | Wieder | 340/173 |
| 3,876,827 | 4/1975 | Janssen | 178/7.1 |
| 3,876,841 | 4/1975 | Kramer et al. | 179/100.3 |
| 3,876,842 | 4/1975 | Bouwhuis | 179/100.4 |
| 3,932,700 | 1/1976 | Snopko | 178/6.6 |
| 3,941,945 | 3/1976 | Borner et al. | 179/100.3 |
| 3,952,191 | 4/1976 | Tinet | 250/201 |
| 3,992,574 | 11/1976 | Bouwhuis et al. | 178/6.6 |
| 3,999,008 | 12/1976 | Bouwhuis et al. | 358/128 |
| 4,000,397 | * 12/1976 | Hebert et al. | 235/462 |
| 4,094,010 | 6/1978 | Pepperl et al. . | |
| 4,578,571 | * 3/1986 | Williams | 235/472 |
| 4,641,204 | 2/1987 | Sugiyama . | |
| 4,818,886 | * 4/1989 | Drucker | 235/462 |
| 5,283,159 | 2/1994 | Norton et al. . | |
| 5,593,343 | 1/1997 | Bauer . | |

FOREIGN PATENT DOCUMENTS

3602008 * 7/1987 (DE) ..................................... 235/467

* cited by examiner

Primary Examiner—Mark Tremblay

(57) ABSTRACT

A system for reading data stored on a target in two different viewing planes includes a laser light source for generating a laser light beam and mirrors for focusing the laser beam on the two spaced apart viewing planes. Sensors detect the light reflected from each of the two viewing planes and generates an electrical signal indicative of the detected light. A signal processor, processes and decodes the data associated with the viewing plane on which the beam is in focus.

4 Claims, 5 Drawing Sheets

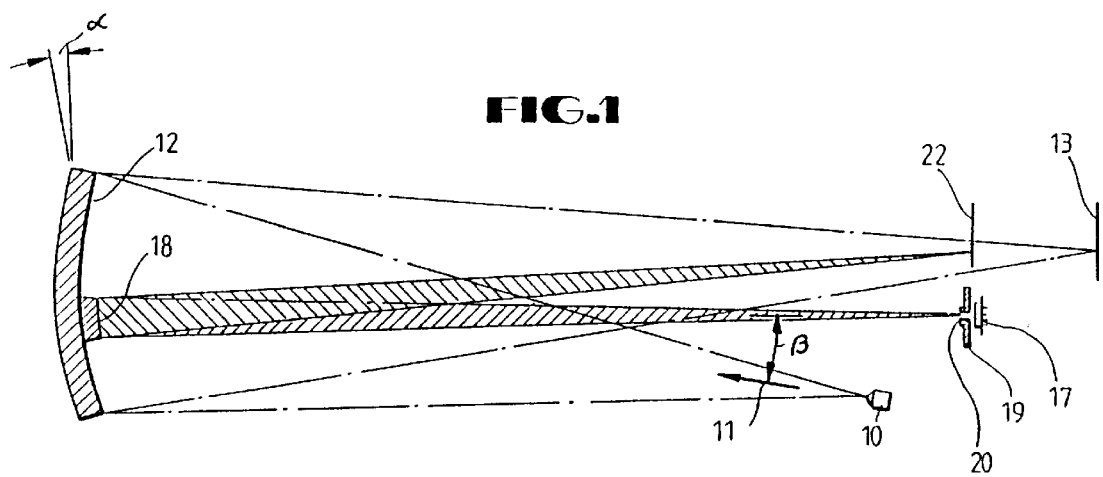
FIG. 1
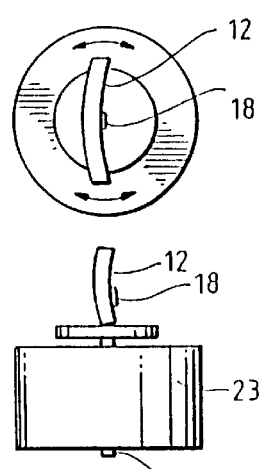
FIG. 4
FIG. 3
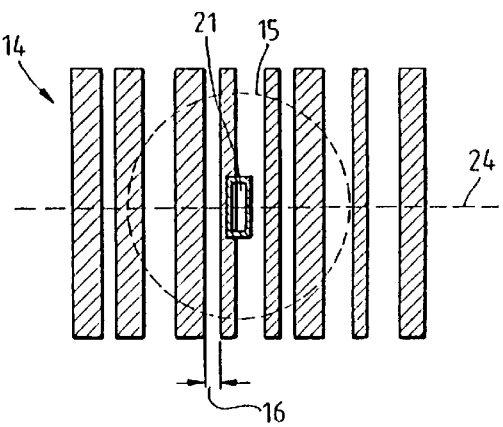
FIG. 2
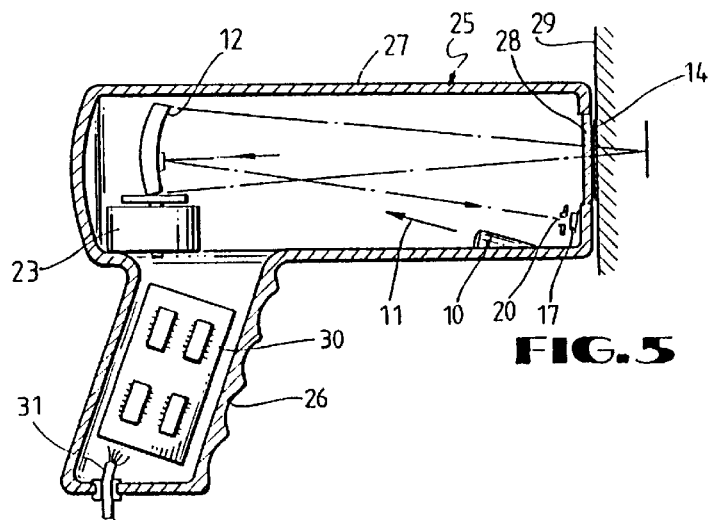
FIG. 5

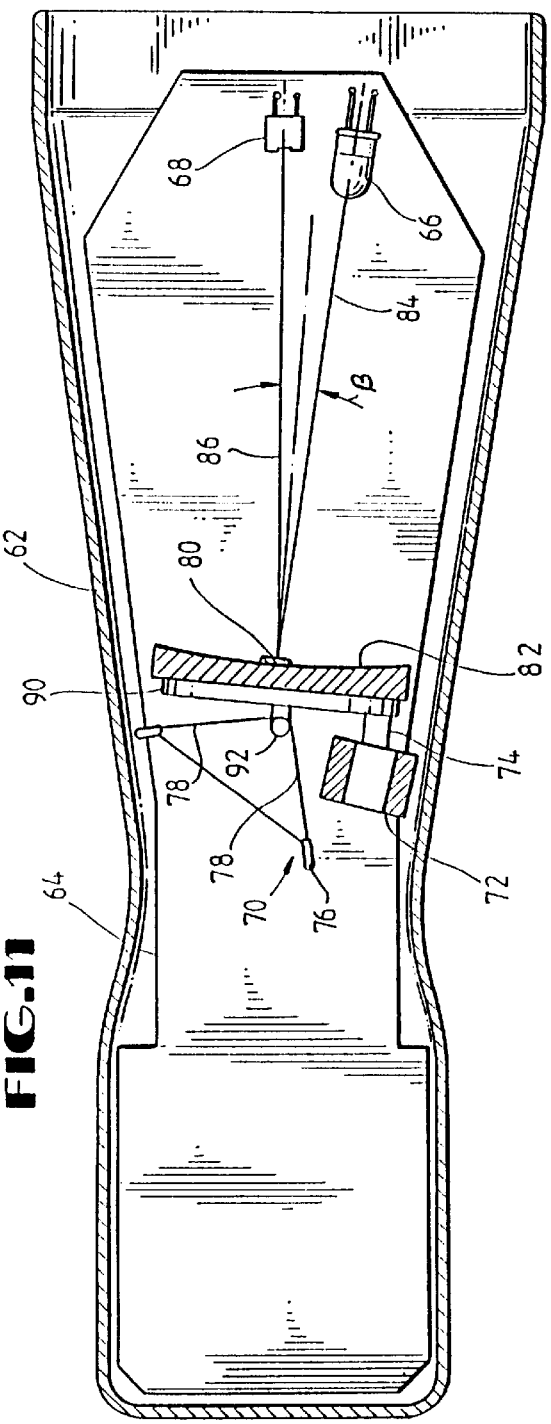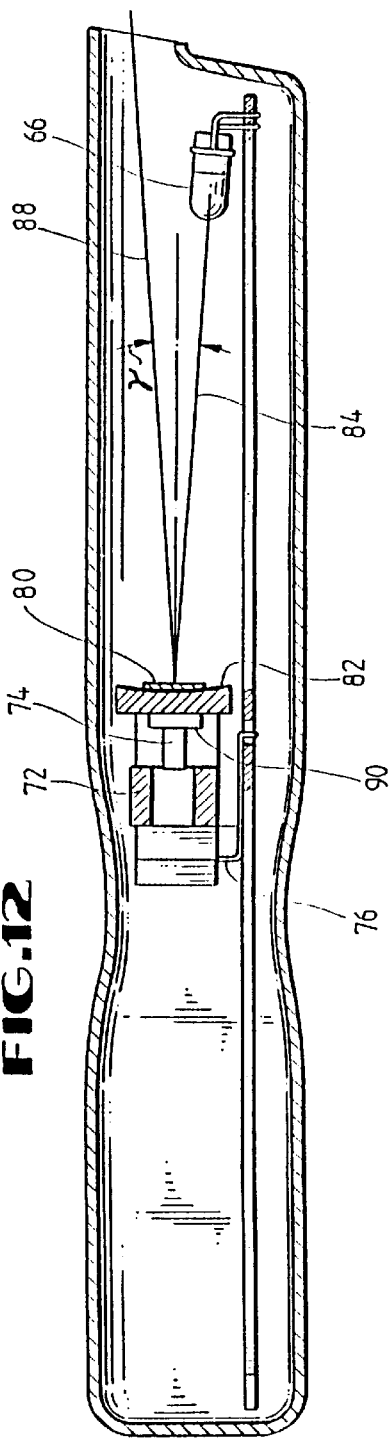

SYSTEM FOR READING DATA ON DIFFERENT PLANES OF FOCUS BASED ON REFLECTED LIGHT

This application is a divisional of U.S. patent application Ser. No. 08/425,808, filed Apr. 20, 1995, now U.S. Pat. No. 5,557,094 which is a divisional of U.S. patent application Ser. No. 08/056,878, filed May 5, 1993, now U.S. Pat. No. 5,410,139 which is a continuation of U.S. patent application Ser. No. 08/047,340, filed Apr. 19, 1993, now U.S. Pat. No. 5,268,564 which is a continuation of U.S. patent application Ser. No. 07/772,745, filed Oct. 7, 1991, now abandoned which is a continuation of U.S. patent application Ser. No. 07/562,130, filed Aug. 3, 1990, which issued into U.S. Pat. No. 5,151,580 on Sep. 29, 1992. The U.S. patent applications are hereby incorporated by reference.

BACKGROUND OF THE INVENTION

This invention generally relates to an electro-optical scanning system for reading symbols, especially bar code symbols and, more particularly, to non-laser-based scanners operative for focusing a light beam and the view of a light sensor in different planes exteriorly of a scanner housing.

It has heretofore been proposed to read bar code symbols, particularly of the Universal Product Code (UPC) type, by using laser and non-laser scanners of the type disclosed in, for example, U.S. Pat. Nos. 4,251,798; 4,387,297; 4,409,470; 4,806,742 and 4,825,057, all of which have been assigned to Symbol Technologies, Inc., the assignee of this invention, and are hereby incorporated by reference herein.

Typically, a laser beam generated by a laser source, for example, a gas laser tube or a semiconductor laser diode, is optically focused by an optical train into a generally circular laser beam spot on a symbol. The beam spot is swept by a scanning component over the symbol and forms a scan pattern thereon. Laser light reflected off the symbol is detected by a light sensor, e.g. a photodiode, mounted together with the laser source, the optical train, the scanning component, and the photodiode in a housing, preferably one having a handle to enable hand-held, portable operation.

The symbol itself is a code pattern comprised of a series of bars of various widths, the bars being spaced apart from one another to bound spaces of various widths, the bars and spaces having different light-reflective properties. Although dimensions may vary, depending on the particular application and the density of the symbol, each bar and space of a UPC symbol typically used in the retail industry to identify retail products measures on the order of thousandths of an inch (mils). In practice, the generally circular laser beam spot has a cross-sectional diameter on the order of 6 to 10 mils.

Although the known laser scanners have enjoyed considerable commercial success, there is nevertheless incentive to reduce the cost of the scanner unit. The laser devices produce a very intense light spot of small size, and thus have inherent advantages. However, the laser light sources are of relatively high cost compared, for example, to non-laser sources such as light emitting diodes (LEDs). The use of non-laser sources presents problems, since it is difficult to focus a non-collimated source to beam spot sizes measuring on the order of mils, at least not without resorting to expensive, heavy, multiple-element optical trains or loss of power. LED's can typically be focused to spot sizes on the order of millimeters. However, using such a large-sized beam spot to read bars and spaces which measure on the order of mils imposes a significant burden on the signal processing and decode circuitry for the scanner. Non-reads and reading errors are likely.

By contrast, in laser-based systems, where the laser beam spot dimensions are on the same order of magnitude as those of the bars and spaces to be decoded, the signal processing and decoding circuitry has no such burden. The photodiode in such laser-based systems typically "looks" at a large volume of space surrounding the beam spot and in a common plane therewith.

SUMMARY OF THE INVENTION

It is a principal object of this invention to provide improved electro-optical scanners. Another object is to provide improvements in practicality, reliability, freedom from errors, and/or cost reduction in low-cost, non-laser-based scanners. An additional object is to provide a method of focusing a light beam into a scan spot, and to focus the view of a photodiode into a viewing window which is sized to lie within the scan spot. A further object is to provide a method of positioning the scan spot and the viewing window in different planes exteriorly of a housing for the scanner. In addition, an object is to provide a scanner device which is of low cost and high reliability, and is simple and convenient to operate by unskilled users. Further, an object is to provide an improved scanner that automatically adapts to varying scanning conditions without operator intervention.

To achieve the objects and in accordance with the purpose of the invention, as embodied and broadly described herein, a system for reading data on a target in two different viewing planes includes a laser light source for generating a laser light beam and mirrors for focusing the laser beam toward the data in the two viewing planes. Sensors detect the light reflected from each of the two viewing planes and generates an electrical signal indicative of the detected light. A signal processor, responsive the electrical signal, processes and decodes the data associated with the viewing plane on which the beam is focused. In a preferred embodiment the system further provides for adjusting a bandwidth of the electrical signal.

BRIEF DESCRIPTION OF THE DRAWINGS

The novel features which are considered as character the invention are set forth in the appended claims. The invention itself, however, both as to its construction and its method operation, together with additional objects and advantages thereof, will be best understood from the following description of specific embodiments when read in connection with the accompanying drawings, wherein:

FIG. 1 is an elevation view in diagrammatic form of one embodiment of a non-laser-based system for reading bar code symbols according to this invention;

FIG. 2 is an enlarged view of a viewing window superimposed on a scan spot that, in turn, is superimposed over a bar code symbol to be read by the system of FIG. 1;

FIG. 3 is an elevation view of a scan motor and mirror assembly used in the scanner of FIG. 1;

FIG. 4 is a top view of the scan motor and mirror assembly of FIG. 3;

FIG. 5 is an elevation view of a hand-held scanner unit constructed according to the embodiment of FIGS. 1, 3 and 4;

FIG. 11 is a top view of a currently preferred commercial embodiment of the scanner head in accordance with this invention;

FIG. 12 is a side view of a currently preferred commercial embodiment of the scanner head in accordance with this invention.

DETAILED DESCRIPTION OF SPECIFIC EMBODIMENTS

Figure 6:
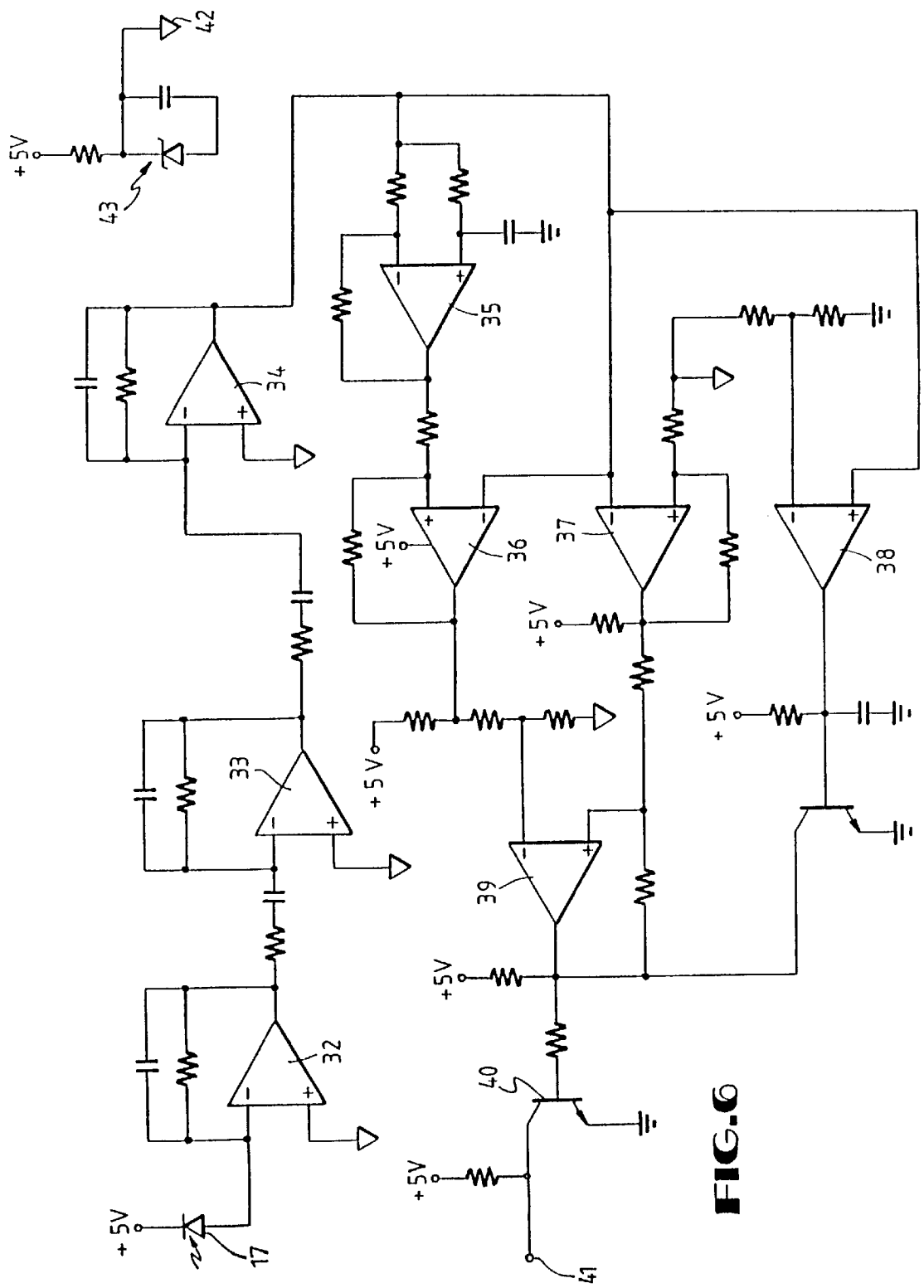
FIG. 6 is an electrical circuit diagram in schematic form of a digitizer circuit used in the system of FIGS. 1–5 according to one embodiment of the invention.

Referring now to FIG. 1 of the drawings, a system for reading symbols is illustrated. The term "symbol" as used herein is intended to cover indicia composed of portions having different light-reflective properties. The indicia may, in a preferred case, be the omnipresent UPC bar code symbol, or other codes such as Code 39, Code bar, Interleaved 2 of 5, or other characters.

The system of FIG. 1 includes a non-laser type of laser source 10, such as an LED or semiconductor light emitting diode. The source 10 produces a non-coherent, non-collimated, wide-angle light beam 11 which is focused by a curved mirror 12 onto a plane 13. The bar code symbol 14 to be read is shown in FIG. 2, and it is noted that a spot 15 of light produced by the focused beam 11 is much larger than the minimum dimension 16 of the bars or spaces of the symbol 14 in the viewing plane. A light sensor 17 such as a photodiode is included in the system of FIG. 1, and the light reflected from the symbol 14 due to light beam 11 is focused by a smaller curved mirror 18 onto the detecting surface of this sensor. An apertured wall 19 blocks reflected light from reaching the sensor 17 except that passing through a slit 20. This slit is preferably of an elliptical shape, perhaps 6×16 mils in size, to define a field view or viewing window 21 for the sensor as seen in FIG. 2. The viewing window 21 of the sensor 17 is focused by the mirror 18 to be in a plane 22, which is axially spaced from the focal plane 13 produced by the mirror 12 for the light beam 11. The symbol 14 to be read is located in the plane 22, so the image of the slit 20 in the plane 22 forms the viewing window 21 on the symbol. The focal lengths of the two mirrors 12 and 18 are the same in an example embodiment, so the spacing between plane 13 and plane 22 is due to the difference in spacing of the light source 10 and the sensor 17 from the mirrors.

The mirrors 12 and 18 are driven by a motor 23 as seen in FIGS. 3 and 4 so that the spot 15 and the viewing window 21 move in the plane 22 across the symbol 14 in a scan line 24 as seen in FIG. 2. The smaller mirror 18 is mounted on the larger mirror 12 and is angularly displaced in a manner such that a central axis of the mirror 18 is displaced by an angle a with respect to a central axis of the mirror 12. The light source 10 is on an axis with respect to the mirror 12 which is angularly displaced, by an angle β, with respect to an axis on which the sensor 17 resides. The angle α is one-half that of angle β.

The scanned spot 15 resulting from the light beam 11 is much larger than the viewing window 21 of the sensor 17, so only a very small part of the illumination by the light beam is sensed; of course, only a small part of the reflected light reaches the photodetector. In addition, an LED generally produces a light beam of lower intensity compared to a laser source. Thus, it is important that the mirror 12 be large so that more of the LED light is focused onto the scan plane and the light density in the spot 15 is reasonably high. Note that the construction of a typical laser scanner is reversed from that of FIGS. 1 and 2; in a laser scanner a bright, sharply-focused laser beam produces a spot of about the size of the minimum dimension 16 of the bar code pattern, then the photodetector employed has a field of view much larger than the laser beam spot. In contrast, here the spot 15 produced by the light beam is large, and the viewing window 21 is small.

Referring to FIG. 5, in one embodiment, the scanning system of FIGS. 1–3 is mounted in a hand-held, gun-shaped housing 25 which has a handle 26 and a barrel portion 27. The system is, in this embodiment, a "contact" type of bar code scanner, 'in that the package containing the bar code symbol 14 is directly in front of the front or snout end of the housing when the reading operation takes place. A window or opening 28 in the front end of the barrel portion 27 of the housing 25 is transparent to the light beam 11 and the reflected LED light going back to the sensor 17, and this window 28 is placed in contact, or very close to, the surface 29 of the package having the bar code symbol 14 thereon. An actual window element may be omitted (i.e., it may be just a hole formed in the housing), or the window 28 may be spaced a distance such as ½ inch inside the front end of the housing; this spacing protects the window from scratching.

The plane 22 of the image of the slit 20 is seen to be almost in the same plane as that of the light sensor 17, as the sensor is near the front of the barrel 27, vertically displaced from the window 28. The mirrors 12 and 18 and the drive motor 23 are mounted in the back end of the barrel 27. The circuitry used to process the electrical signal produced by the sensor, and other control circuitry needed in the unit, is mounted on circuit boards 30 in the handle 26. The unit of FIG. 5 is connected to a terminal or base station by a cable 31 containing conductors for carrying the processed bar code data, as well as voltage supplies for the light source 10 and motor 23. Alternatively, an RF link may be used to send the signals back to a base station, in which case a battery is included within the housing 25, e.g., in the handle. In either event, a compact, light-weight, hand-held unit is thus provided.

FIG. 6 depicts a preferred digitizer, i.e., a circuit to obtain a digital signal representing a-bar code from the analog signal developed by the light sensor or photodetector 17. The sensor 17 is connected to circuitry for processing the electrical signals produced as a result of the bar code scan. FIGS. 7a to 7f depict the signals appearing at various points in the circuit of FIG. 6.

Figure 7A:
FIGS. 7a to 7f are timing diagrams of voltages appearing in the circuit of FIG. 6.
Figure 7B:
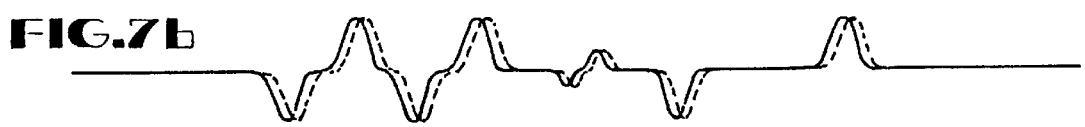

FIG. 7a depicts the original analog signal that the sensor 17 feeds to a current-to-voltage converter 32. The converter 32 feeds the developed voltage to a differentiator 33. The differentiator 33 develops the first-derivative of the converted analog signal. The differentiator 33 sends this first-derivative signal to an amplifier 34 which amplifies and filters the first derivative signal. The solid line FIG. 7b depicts this amplified and filtered (and inverted) first-derivative signal. This signal is inverted since each of the converter 32, the differentiator 33, and the amplifier 34 receives its input signal at its inverting input.

Figure 7C:
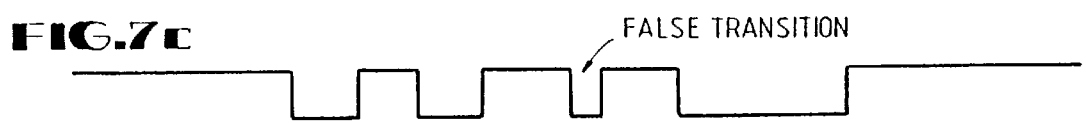

The amplified and filtered first-derivative signal is fed to four elements: a delay element 35, a peak-locating comparator 36, a false-transition gating comparator 37, and a margin-threshold circuit 38. The dotted line in FIG. 7b depicts the delayed first-derivative signal. The amplified first-derivative signal and the delayed first-derivative signal feed the inverting and non-inverting inputs of the peak-locating comparator, respectively. As shown in FIG. 7b, there are points in time where these signals cross; i.e., they are equal. At these crossing points, the output of the peak-locating comparator changes state. FIG. 7c depicts the output of the peak-locating comparator 36. The peak-locating comparator 36 feeds this output signal to a latch comparator 39.

Figure 7D:

The false-transition gating comparator 37 also receives the amplified first-derivative signal at its inverting input. A feedback signal is connected to the non-inverting input of the comparator 37. FIG. 7d depicts the output of the comparator 37. If the false-transition gating comparator has changed state since the last change of state of the peak-locating comparator, the latch comparator will change state. In other words, the latch comparator only changes state upon the first transition of the peak-locating comparator following a transition of the gating comparator. In this way, noise that might cause spurious transitions on the output of the peak-locating comparator do not cause false transitions on the latch comparator output unless the noise is big enough to trip the false-transition gating comparator.

Figure 7E:

The output of the latch comparator 39, is fed through a transistor 40 to an output 41. FIG. 7e depicts the signal at the output 41. Also, for each point in the circuit requiring an analog ground 42, this ground is developed by an auxiliary circuit 43.

The level at which the gating comparator trips is determined by the amount of hysteresis resulting from the positive feedback provided. This level is set to be slightly lower than the smallest genuine signal peaks that are expected, but higher than the typical nose levels. The peak-locator comparator, on the other hand, is provided with minimal hysteresis so as to insure maximum digitizing accuracy.

Figure 7F:

The margin threshold, set by the margin threshold circuit 38, is set to be a fixed D.C. voltage below zero. The margin threshold circuit 38 acts like a retriggerable one shot multivibrator that will not time out as long as there is a continuous series of pulses that exceed the threshold. When the pulses stop long enough for it to time out, the digitized bar output is forced back to the white (space) state. FIG. 7f depicts the output of the margin threshold circuit 38. This margin threshold circuit 38 provides increased noise immunity in the margin, i.e. the region beyond the extremes of the bar code.

Figure 8:
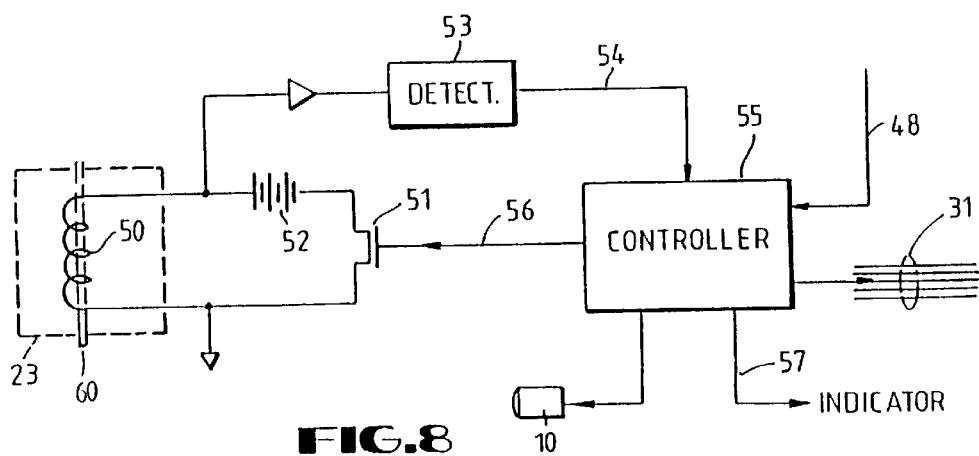
FIG. 8 is an electrical circuit diagram in schematic form of a movement detector circuit used in the system of FIGS. 1–5 according to a feature of an alternative embodiment of the invention.

Referring to FIG. 8, a technique for turning the scan motor 23 on and off is disclosed. Usually, a trigger switch is employed so that the user can manually initiate the scan operation by squeezing the trigger on the handle of a hand-held scanner unit when the user is ready to read a bar code symbol. In the interest of reducing the parts count and assembly time, and thus lowering cost and increasing reliability, the mechanical trigger switch is eliminated by turning the unit on in response to the unit being picked up by the operator. A motion or acceleration detecting mechanism is thus employed, so whenever the unit is laid down on the counter by the user, the scan motor 23 and the LED light source 10 are turned off (as by a time out arrangement), but when the unit is picked up the motion is detected and used to initiate operation of the scanner.

To this end, the coil 50 of the motor 23 is connected through a switch 51 in series with the power supply 52, so the motor 23 is energized only when the FET switch 51 is turned on. The voltage across the coil 50 is detected by a detector 53, however, so that when the motor coil is not energized, any movement of the motor shaft can be sensed due to a small voltage generated in the coil by movement of the rotor past the coils. The mirrors 12 and 18 are pivoted to rotate freely with the motor shaft, and any slight movement when the motor coil 50 is not energized will cause the mirrors to move. The output 54 from the detector 53 is applied to a controller 55, and an output 56 from the controller 55 is applied to the gate of the FET switch 51 to turn on or turn off the motor. The controller 55 may be an Intel 8031 type of microcontroller, for example, and may be the controller used to evaluate the digitized bar code signals from output 41 in FIG. 6. In addition, an output 57 from the controller 55 is employed to activate the LED light source 10. An indicator light 58 (or beeper) may also be activated by the controller 55 when a valid bar code is decoded, demonstrating to the user that the task is completed. The controller 55 may also contain timing registers used to count down various time-out periods; for example, the motor and light source may be automatically cut off after a given period since the turn-on initiated by the detector 53, or after a valid bar code has been recognized. If the unit is turned off by the time-out when the user still has the housing 25 in his hand and is going to read other bar codes, then it will be turned on again due to the movement to orient to toward the next bar code symbol.

Instead of the contact type of scanner seen in FIG. 5, the unit may be of the type held several inches or more away from the symbol to be read, as found, for example, by reference to U.S. Pat. Nos. 4,387,297; 4,409,470 and 4,816,660, the entire contents of which are hereby incorporated by reference herein. The housing 25 can also be incorporated in a stand-alone workstation mounted on a counter top or similar support surface for use in either a scan-above, scan-below or scan-sideways systems. The head can be incorporated in a fixed or adjustable mount installation.

The scanning mechanism including the pivoted mirrors 12 and 18 mounted on the shaft 60 of the motor 23 is operative for sweeping the scan spot 15 across the symbol 14 in a scan, and is preferably a high-speed scanner motor of the type shown and described in U.S. Pat. No. 4,387,397, the entire contents of said patent being incorporated herein by reference and made part of the instant application. For purposes of this application, it is believed to be sufficient to point out that the scanner motor 23 has an output shaft 60 on which the focusing mirror 12 is fixedly mounted. The motor 23 is driven to reciprocatingly and repetitively oscillate the shaft and mirror in alternate circumferential directions about the axis of the shaft 60 over are lengths of any desired size, typically much less than 360° (The embodiment of FIGS. 1 and 5 uses an angle of about 32°), and at a rate of speed on the order of a plurality of oscillations per second. In a preferred embodiment, the focusing mirror 12 and the shaft 60 are oscillated jointly so that the scan spot 15 is respectively swept in a linear scan 24 across the symbol 1–4 lengthwise thereof an angular distance or arc length at the scan plane 22 of about 32° and at a rate of about twenty scans to forty oscillations per second.

Although this invention is being described in connection with a single linear scan 24 extending across a symbol 14, it is not intended for the invention to be so limited, since various other types of scan pattern may be formed over the symbol to be read. The scan pattern, for example, can be a set of mutually parallel linear scan lines, as set forth in copending application Ser. No. 317,533, filed Mar. 1, 1989, or in U.S. Pat. Nos. 4,369,361 or 4,387,297.

As previously mentioned, each of the bars and spaces of the symbol 14 of the density commonly found in the retail industry for identifying retail merchandise measures on the order of a few mils. The scan spot 15, which is focused by the focusing mirror 12, measures on the order of several millimeters and, hence, would lead to decoding errors, since the scan spot 15 is much too large to reliably detect the leading and trailing edges of each bar of the symbol. In laser-based scanners, the cross-section of the scan spot at the symbol generally measures from 6- to 10-mils, and this size is generally regarded as being optimal for minimizing decoding and reading errors without resorting to complex, highly sophisticated, signal processing circuitry or excess power loss.

Hence, in accordance with this invention, imaging means are provided in the housing 25 for imaging a viewing window 21 of the photodiode 17, the viewing window 21 having an area smaller than that of, and located entirely within, the scan spot 15. The imaging means advantageously includes an imaging mirror 18, and an apertured wall 19 having an aperture or slit 20 formed therethrough. The imaging mirror 18 is advantageously mounted on the focusing mirror 12 for joint movement therewith by the scanner motor 23 about the axis or the shaft 60. The imaging mirror 18 is angularly offset from the axis of the mirror 12 at an angle α. The slit 20 is located immediately adjacent a sensor opening of the photodiode 17. The sensor opening can itself serve as the slit 20. Alternatively, the photodiode 17 may advantageously be a very small photodetector. Such a small photodetector reduces noise, lowers cost of the scanner, and diminishes sensitivity to soiled optics. The slit 20, in a preferred embodiment, is formed with a generally rectangular or elliptical cross-section whose shorter dimension, e.g. 6-mils, is located along the scan direction, and whose longer dimension, e.g. 16-mils, is located transversely of the scan direction. The rectangular slit 20, together with the imaging mirror 18, form the viewing window 21 with a similar rectangular shape, as best shown in FIG. 2. If the slit 20 is the preferable elliptical shape, then the viewing window 21 will have a similar elliptical shape.

The imaging mirror 18, which also has a generally spherical reflecting surface, positions the viewing window 21 at a viewing plane 22 that is located exteriorly of the housing 25. The viewing plane 22 is longitudinally spaced away from the scan plane 13. Both the focusing and imaging mirrors 12 and 18, preferably, but not necessarily, have the same focal length. The slit 20 is imaged at the viewing plane 22 with a magnification close to one, thereby resulting an image size of the slit of about 6-by-16 mils (the size of the viewing window 21). A first optical axis is concentric with the light beam 11 between the LED 10 and the focusing mirror 12, and a second optical axis is concentric with the with the returning light beam between the imaging mirror 18 and the photodiode 17. The angle β included between these first and second optical axes is on the order of twice the angular offset~between the imaging and focusing mirrors.

Hence, in accordance with this invention, the photodiode 17 "sees" only a very small central portion of the LED scan spot 15. The image of the photodiode slit 20 constitutes the actual scanning spot. The resulting system, therefore, does not have the decoding errors which would be inherent in using a multimillimeter sized scan spot, but, instead uses a viewing window whose dimensions, at least as considered along the scan direction, are on the same order of magnitude as those of the bars and spaces of the symbol to be read.

The invention is not intended to be limited to rectangular slits, since other shapes are possible. The shape of the slit determines the depth of focus and the readability of the symbol.

Figure 9:
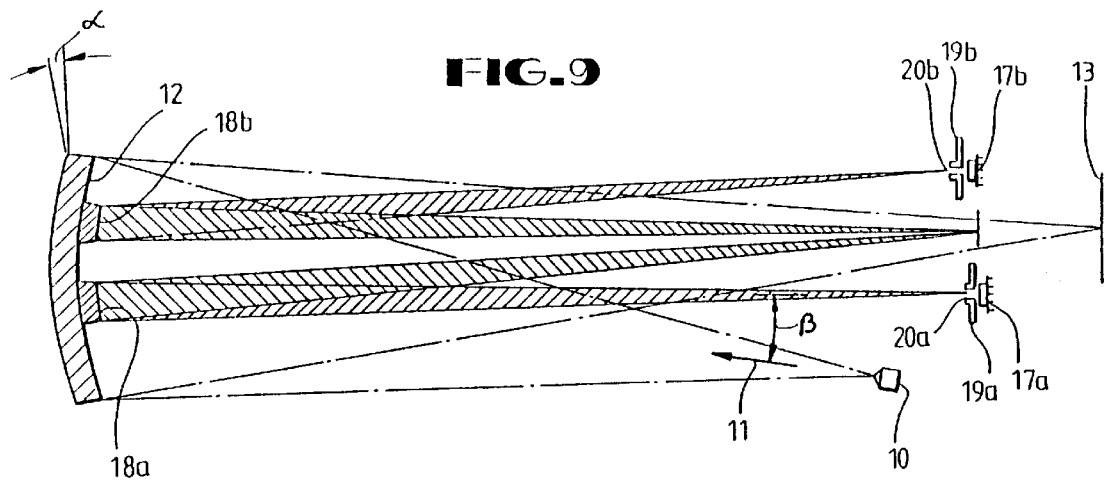
FIG. 9 is an elevation view in diagrammatic form (corresponding to FIG. 1) of another embodiment of a non-laserbased system for reading bar code symbols.
Figure 10:
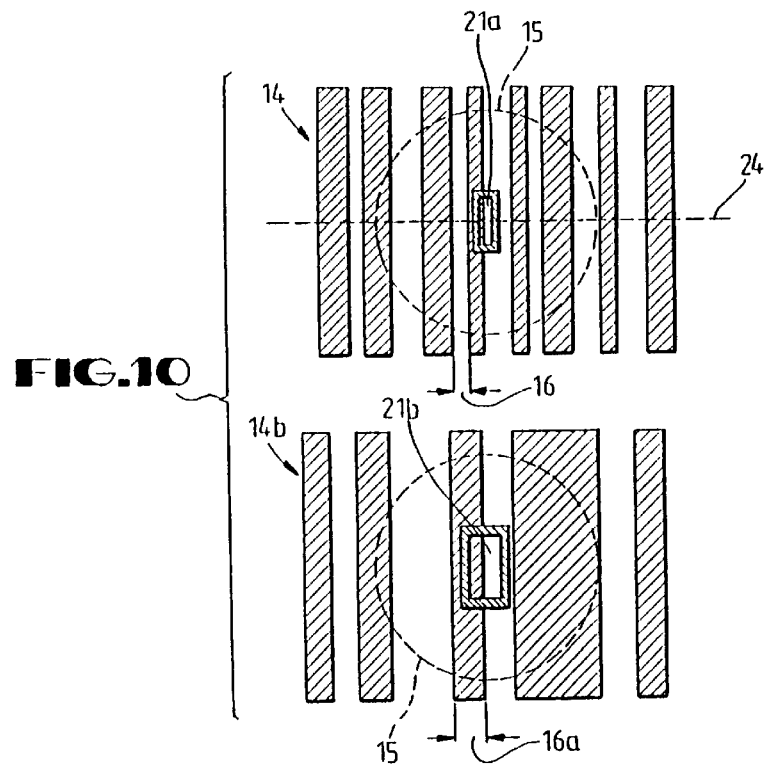
FIG. 10 is an enlarged view of a bar code symbol with two viewing windows and a scan spot (corresponding to FIG. 2) for the embodiment of FIG. 9.

As shown in the alternate embodiment of FIG. 9, rather than relying on a single photodiode, a pair of photodiodes 17a and 17b are provided in the bar code reader, each photodiode and apertured wall has associated with it its own imaging mirror 18a and 18b which, in turn, form a pair of superimposed viewing windows 21a and 21b as seen in FIG. 10. The viewing window 21a is more suited for high density bar code symbols, whereas the viewing window 21b is larger and more suited for low density bar code symbols. The window 21b has a width corresponding to the minimum width of features of the bar code symbol 14b. Alternatively, the viewing windows 21a and 21b may be in different viewing planes 22, offset from each other as well as from the scan plane 13; thus, symbols at different distances from the reader unit may be brought into sharp focus, thereby extending the working range.

FIGS. 11 and 12 depict a currently preferred commercial embodiment of a scanner head in accordance with the present invention. The scanning components are contained with a casing 62 which is preferably of light-weight plastic, yet is sturdy enough to withstand the rigors of normal use. All major components may be mounted on a printed circuit board 64. These major components comprise a light-emitting diode 66, a photodetector 68, a scanning assembly 70, as well as the various electronic and other components to provide the scanning of symbols as described herein.

The scanning assembly 70 includes a coil 72, a magnet 74, a motor support frame 76, a pair of leaf springs 78, preferably of Mylar, a smaller mirror 80, and a larger mirror 82. The light from the LED 66 follows an axis 84 and reflected light returning to the scanner from a symbol to the photodetector follows an axis 86. As before, the angle between the axes 84 and 86 is β, preferably about 8°, for example. Light from the LED 66, reflected by the larger mirror 82, leaves and returns to the scanner in a scan plane 88. The angle r between the axis 84 and the scan plane 88 is preferably about 7.5° to 8°, for example. As shown in FIG. 12, the LED is tilted up slightly to provide this angle, in combination with the arrangement of the larger mirror 82.

To scan a symbol, the coil 72 is pulsed with electrical power a plurality of times a second to provide on the order of 40 scans per second, for example. When the coil 72 is energized, it attracts the magnet 74, which is attached to a mirror support frame 90. The mirror support frame 90 supports the mirrors 80 and 82. Attracting the magnet 74 into the coil 72 pivots the mirror support frame 90 and the mirrors 80 and 82 about a pivot 92. This pivoting action creates torsion stress in the leaf springs 78 and, when the coil is deenergized, the leaf springs restore the mirror support frame and the mirrors to their quiescent position. Pulsing the coil 72 with an electrical pulse train coordinated with the restorative strength of the leaf springs 78 provides a smooth, even scan of the desired frequency and scan width.

As shown in FIGS. 11 and 12, the scanner of the present invention requires no trigger as in known scanners. The scanner preferably employs the motion sensor as described with regard to FIG. 8 which detects when the user picks up the hand-held unit, and turns on the light source and the source of the electrical pulse train to the coil 72 in response to this detection. The pulse train and light source can then be turned off by a time-out circuit, or in response to decoding a valid bar code. The motion sensor also may sense when the user moves the scanner to a next bar code and thereby initiate a scan.

Figure 13:
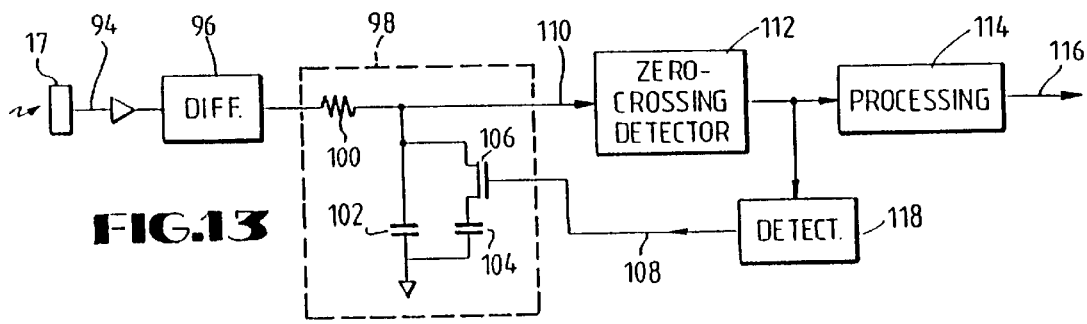
FIG. 13 is an electrical circuit diagram in schematic form of a digitizer circuit that may be used in the system of FIGS. 1–5 according to an embodiment of the invention.

Referring to FIG. 13, the sensor 17 is connected to circuitry for processing the electrical signals produced as a result of the bar code scan. This digitizer circuitry may be of the same general type disclosed in U.S. patent application Ser. No. 440,510, filed Nov. 22, 1989, or other such digitizing circuitry as set forth in the above-identified patents; for example, such signal processing circuitry can be of the type described and claimed in U.S. Pat. No. 4,360,798, incorporated herein by reference. However, according to one feature of a preferred embodiment, an automatic bandwidth control is added. The analog signal produced by the sensor 17 on line 94 is applied to a differential circuit 96 which produces an output that is the first derivative of the analog signal. The frequency content or bandwidth of the analog signal or the first derivative signal is dependant upon the type of bar code symbol 14 being scanned. A high density bar code 14 produces a higher frequency of transitions between black and white and so the signal has more peaks and valleys, or the first derivative has more zero crossings. The output of the differential circuit bar to a low-pass filter 98 which has a resistor 100 an the 102 connected across the differentiator output. The cut-off frequency of this filter is dependant upon the value of the capacitor in series with the resistor, and so in order this cut-off frequency (and thus switch the bandwidth to which the digitizing circuitry responds) and additional capacitor 104 is in parallel with the capacitor 102 and a switch 106 provided to remove this capacitor 104 from the filter circuit. When a voltage exceeding the threshold voltage of the FET switch 106 is applied to a line 108, the switch completes the circuit to place the capacitor 104 in parallel with the capacitor 102 and thus lowers the cutoff frequency (narrows the bandwidth), but if a zero voltage is applied by the line 108 to the gate of FET switch then the capacitor 104 is removed and the cut-off frequency is higher (bandwidth is wider). The output 110 from the filter is applied to a zero-crossing detector 112, producing an output. This signal, again, will have a higher frequency content when the bar code density is higher, since the number of zero-crossings per unit time is higher. The output of the zero-crossing detector 112 is coupled to further processing circuitry 114 of conventional type, producing a digitized electrical signal at output 116, and this signal is either sent to the terminal unit by the cable 31, or further processed to recognize and recover bar code data in the housing 25 itself. In addition, however, the output signal of the zero-crossing detector 112 is applied to a detector 118 (e.g., an integrator circuit and an invertor) to produce a voltage on the line 108 back to the FET switch 106 that is high for low density bar codes and zero for high density bar codes. In this manner, the capacitor 104 is switched out of the circuit when scanning high density bar codes, making the bandwidth of the filter wider, or the capacitor 104 is left in the filter when scanning low density bar codes, making the bandwidth narrower. Thus, due to the narrower bandwidth, noise is removed from the processing circuitry for low density bar code scanning, making it more likely to obtain a valid bar code recognition.

Alternatively, the bandwidth switching circuitry can be response to the output of the bar code recognition arrangement, i.e., downstream of the processor 114. The bar code signals produced at the output 116 are usually examined to see if a valid bar code is being read. A bar code can be recognized or distinguished from noise or from text printed on the package by various methods, or combinations of methods. For example, the number of transitions per unit of scan, or the ratio of black to white per unit of scan, can indicate that the pattern being scanned is most likely a bar code rather than text or other figures. Also, or in addition, a look-up table of valid bar code patters may be maintained in memory and compared with the bar code signals on the output 116. This recognition can be used to select broad or narrow bandwidth, based on identifying the actual type of bar code (high density or low density) being scanned, or failure to recognize a bar code in one scan can result in the bandwidth being switched to see if a valid code is recognized in subsequent scans.

It will be understood that each of the elements described above, or two or more together, also may find a useful application in other types of constructions differing from the types describes above.

While the invention has been illustrated and described as embodied in a light emitting diode scanner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for the various applications without omitting features that, from the stand point of prior art, fairly constitute essential characteristics of the generic or specific aspects of this invention and, therefore, such adaptations should be and are intended to be comprehended within the meaning and range of equivalence of the following claims.

What is claimed as new and desired for protection by a letters patent is set forth in the appended claims.

What is claimed:

1. A system for detecting reflected light comprising:
    a light source for generating a light beam:
    means for sweeping the light beam across an object:
    means for detecting light reflected by the object and for generating electrical signals indicative of the detected light;
    circuitry means for discriminating the electrical signals, said circuitry means including
        means for filtering with a respective cutoff frequency each electrical signal to provide a respective output signal having a respective bandwidth, wherein the means for filtering includes a low pass filter having a resistor in series with a first capacitor which is in parallel with a second capacitor in series with a switch; and
    means for detecting a density of variations of the reflected light from the object and for outputting a control signal to the switch, the switch moving between a first and second position in response to the control signal.

2. The system according to claim 1 wherein, when the control signal indicates a first density, the filtering means includes means for moving the switch to the first position lowering the filtering frequency of the low pass filter, and, when the control signal indicates a second density higher than the first density, the switch moves to the second position corresponding to an increased bandwidth cutoff frequency of the low pass filter.

3. A method for detecting reflected light comprising steps of:
    generating a light beam;
    sweeping the light beam across an object;
    detecting light reflected by the object and generating electrical signals indicative of the detected light;

discriminating the electrical signals, said discriminating step including the step of filtering with a respective cutoff frequency each electrical signal to provide a respective output signal having a respective bandwidth, wherein the filtering step includes the step of filtering each electrical signal through a low pass filter having a resistor in series with a first capacitor which is in parallel with a second capacitor in series with a switch;

detecting a density of variations of the reflected light from the object; and outputting a control signal based on the density to the switch, the switch moving between a first and second position in response to the control signal.

4. The method according to claim 3 further including the steps of moving the switch to the first position lowering the filtering frequency of the low pass filter when the control signal indicates a first density, and moving the switch to the second position raising the filtering frequency of the low pass filter when the control signal indicates a second density.

* * * * *